United States Patent
Renner et al.

[11] 3,964,208
[45] June 22, 1976

[54] DOOR FOR VEHICLE, ESPECIALLY PASSENGER MOTOR VEHICLE

[75] Inventors: Hermann Renner, Magstadt; Dieter Weidemann, Weil der Stadt, both of Germany

[73] Assignee: Daimler-Benz Aktiengesellschaft, Germany

[22] Filed: May 28, 1975

[21] Appl. No.: 581,958

[30] Foreign Application Priority Data
June 1, 1974  Germany............................ 2426705

[52] U.S. Cl.................................... 49/502; 49/374
[51] Int. Cl.².............................................. B60J 1/17
[58] Field of Search............. 49/502, 374, 375, 376, 49/377, 378; 296/146 X, 28 R

[56] References Cited
UNITED STATES PATENTS

| | | |
|---|---|---|
| 2,232,344 | 2/1941 | Schafer.................................. 49/378 |
| 2,232,345 | 2/1941 | Schiff.................................... 49/378 |
| 3,808,743 | 5/1974 | Renner et al. ......................... 49/502 |
| 3,868,796 | 3/1975 | Bush................................. 296/146 X |

*Primary Examiner*—Philip C. Kannan
*Attorney, Agent, or Firm*—Craig & Antonelli

[57] ABSTRACT

A door for vehicles which includes an outer door panel and an inner door panel and is equipped with a lowerable window; the inner door panel thereby extends through the plane formed by the lowered window in such a manner that above the area where it passes through this plane, the inner door panel extends on the side of this plane facing the interior space of the vehicle and below this area, it extends on the side of this plane facing the outer door panel; within the area where it passes through the plane of the lowered window, the inner door panel is provided with an aperture for the passage of the lowerable windowpane.

16 Claims, 5 Drawing Figures

U.S. Patent   June 22, 1976   3,964,208
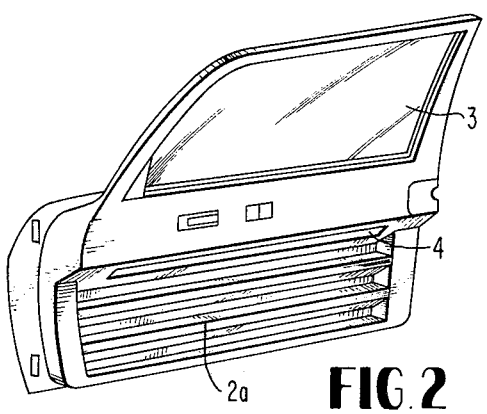
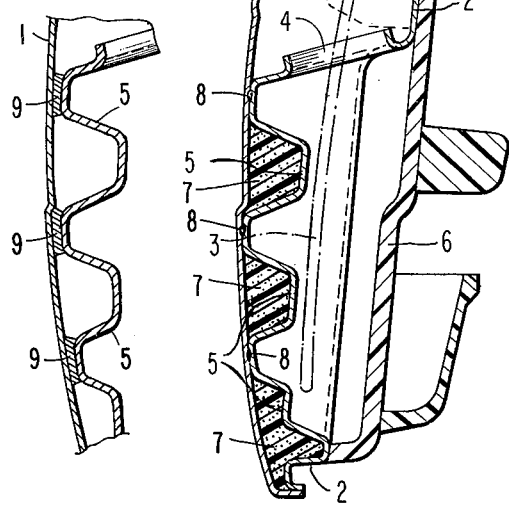
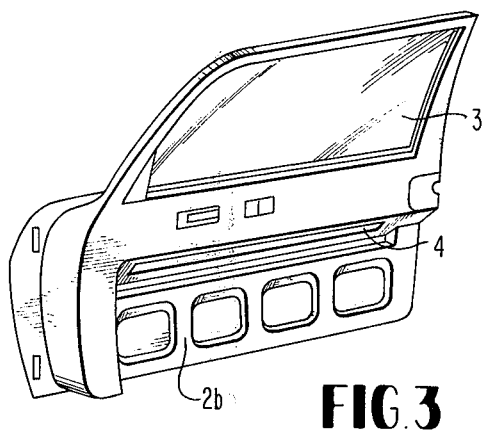
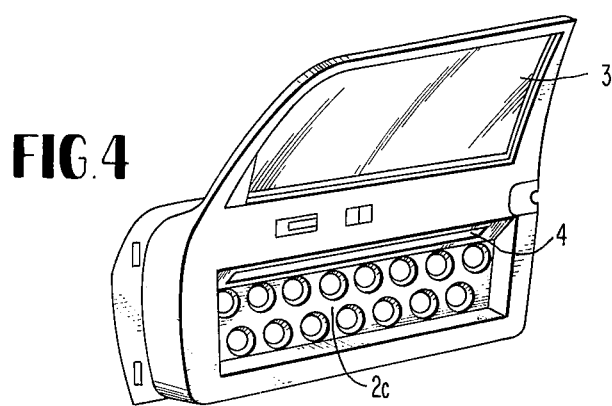

DOOR FOR VEHICLE, ESPECIALLY PASSENGER MOTOR VEHICLE

The present invention relates to a door for vehicles, especially for passenger motor vehicles, which includes an outer sheet metal door panel and an inner sheet metal door panel and which is provided with a lowerable window.

It is known that in particular with vehicle doors having lowerable windowpanes, difficulties exist to reinforce the doors to such an extent that in case of lateral collisions, a sufficient protection for the vehicle passengers is provided.

The present invention is therefore concerned with the task to construct such a vehicle door as weight and space-saving as possible in such a manner that especially the high indentation resistance required by law is attained at the beginning of the door deformation.

This is achieved according to the present invention in that the inner sheet metal door panel member extends through the plane formed by the lowered windowpane in such a manner that the inner sheet metal door panel member extends on the side of the plane of the lowered window facing the interior space of the vehicle above the place where it passes through the plane of the lowered window, and on the side of the plane of the lowerable window facing the outer sheet metal door panel member below the place, where it passes through this window plane, and in that the inner sheet metal door panel member is provided with an aperture for the windowpane within the area where the window extends through the inner door panel.

A particularly effective reinforcement is achieved if the inner sheet metal door panel member is so constructed in its area facing the outer sheet metal door panel member and is so connected with the latter that at least one hollow bearer is formed that preferably extends horizontally.

However, a reinforcing effect can also be achieved in that the inner sheet metal door panel member is provided within its area facing the outer sheet metal door panel member with reinforcing embossments, indentations, corrugations, or the like and is connected with the outer sheet metal door panel member, for example, by bonding, gluing, spot-welding, or the like.

Finally, a further reinforcing effect is achieved if hollow spaces formed between the inner sheet metal door panel member and the outer sheet metal door panel member are filled with a reinforcing material such as, for example, a synthetic resinous foamed material of any conventional type. This can take place either by foaming out with such a material the unfinished structural part or by insertion of pre-manufactured formed parts.

Accordingly, it is an object of the present invention to provide a door for vehicles, especially for passenger motor vehicles which avoids by simple means the aforementioned shortcomings and drawbacks encountered in the prior art.

Another object of the present invention resides in a door for vehicles which offers sufficient protection for the vehicle passengers in case of lateral collisions.

A further object of the present invention resides in a door for vehicles, especially passenger motor vehicles, equipped with a lowerable window which not only ensures adequate protection of the passengers against lateral impacts but is simple in construction, permitting a saving both in weight and cost.

A further object of the present invention resides in a vehicle door with a lowerable window in which the high buckling and indentation resistance, as required by law, is reached already at the beginning of the deformation of the door in case of lateral impacts.

Still another object of the present invention resides in a vehicle door of the type described above which is characterized by a particularly effective reinforcement which can be realized in a simple manner.

These and other objects, features and advantages of the present invention will become more apparent from the following description when taken in connection with the accompanying drawing which shows, for purposes of illustration only, several embodiments in accordance with the present invention, and wherein:

FIG. 1 is a somewhat schematic vertical crosssectional view through a door of a passenger motor vehicle in accordance with the present invention;

FIG. 1a is a somewhat schematic vertical cross-sectional view through a portion of a door of a passenger motor vehicle constructed in accordance with another preferred embodiment of the present invention; and FIGS. 2 through 4 are perspective views of different embodiments of doors in accordance with the present invention as viewed from the inside of the door thereof.

Referring now to the drawing wherein like reference numerals are used throughout the various views to designate like parts, the door of a passenger motor vehicle illustrated in cross section in FIG. 1 of the drawing, includes an outer sheet metal door panel member 1 and an inner sheet metal door panel member 2, whereby the latter extends in its upper area on the side of the plane formed by the lowered windowpane 3 indicated in dash lines or by the guidances thereof (not illustrated), facing the vehicle interior space, and in its lower area on the side of this plane facing the outer sheet metal door panel member 1. The upper area of the inner sheet metal door panel member 2 serves for the mounting of the door lock and of the actuating installations and as abutment surface for the inner door covering. Within the area, in which the inner sheet metal door panel member 2 extends through the aforementioned plane, it is provided with an aperture or opening 4 for the passage therethrough of the windowpane 3. In its lower area, the inner sheet metal door panel member 2 is constructed approximately meander-shaped, and is so connected with the outer sheet metal door panel member 1 that three approximately horizontally extending hollow bearers 5 are formed. The bearers 5 may thereby pass over into a conventional lateral frame structure not illustrated in detail. The inner side of the door is covered off by a covering 6 which consists preferably of a formrigid plastic material, which is, however, energy-absorbing under load. Such plastic materials as, for example, synthetic resinous material possessing these properties are known in the art.

In the FIG. 1 embodiment, the space enclosed by the bearers 5 is filled with a reinforcing consisting of a foam synthetic resinous material 7. The parts are spot-welded together as schematically depicted by reference numeral 8. In the FIG. 1a embodiment, the panel members are bonded together by bonding means 9, schematically illustrated.

The vehicle doors illustrated in FIGS. 2 to 4 of the drawing include each differently constructed and reinforced inner sheet metal door panel members 2a, 2b and 2c, but as to the rest are completely identical with the embodiment according to FIG. 1.

In FIG. 2, the lower area of the inner sheet metal door panel member 2a is provided with reinforcing corrugations while the inner sheet metal door panel member 2b of FIG. 3 is provided with relatively large approximately rectangular reinforcing embossments. The inner sheet metal door panel member 2c of FIG. 4 is provided with relatively small circular pressed-out portions or embossments providing the desired reinforcement.

It is possible with the arrangement according to the present invention to reduce the door thickness compared to hitherto customary doors in favor of a deeper door pocket, a wider arm rest and/or a wider interior space. As a result of improved accessibility, also the assembly of the lowerable window and of the associated guide elements and actuating means is simplified by the present invention.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A door for vehicles which comprises an outer door panel means and an inner door panel means, and which is equipped with a lowerable window means, characterized in that the inner door panel means extends through the plane formed by the lowered window in such a manner that above the place where it extends through said plane, the inner door panel means is disposed on the side of said plane facing the interior space of the vehicle and below this place, on the side of said plane facing the outer door panel means, and said inner door panel means being provided with an aperture means for the windowpane of said window means within the area where the inner door panel means extends through said plane.

2. A door according to claim 1, characterized in that the inner door panel means is so constructed in its area facing the outer door panel means and is so connected with the latter that at least one hollow bearer means is formed.

3. A door according to claim 2, characterized in that the hollow bearer means extends essentially horizontally.

4. A door according to claim 1, characterized in that the inner door panel means is provided in its area facing the outer door panel means with reinforcing means.

5. A door according to claim 4, characterized in that the reinforcing means are in the form of embossments.

6. A door according to claim 4, characterized in that the reinforcing means are in the form of corrugations.

7. A door according to claim 4, characterized in that the reinforcing means are in the form of indentations.

8. A door according to claim 4, characterized in that the inner door panel means is connected with the outer door panel means within the area of the inner door panel means facing the outer door panel means.

9. A door according to claim 8, characterized in that the panel means are spot-welded together within the area of their mutual connections.

10. A door according to claim 8, characterized in that the panel means are bonded together within the area of their mutual connections.

11. A door according to claim 8, characterized in that hollow spaces formed between the inner and outer door panel means are filled with reinforcing material.

12. A door according to claim 11, characterized in that said material essentially consists of a foamed synthetic resinous material.

13. A door according to claim 12, characterized in that the inner and outer door panel means consist of sheet metal.

14. A door according to claim 1, characterized in that the inner door panel means is connected with the outer door panel means within the area of the inner door panel means facing the outer door panel means.

15. A door according to claim 1, characterized in that hollow spaces formed between the inner and outer door panel means are filled with reinforcing material.

16. A door according to claim 15, characterized in that said material essentially consists of a foamed synthetic resinous material.

* * * * *